US011121622B2

(12) United States Patent
Chen et al.

(10) Patent No.: US 11,121,622 B2
(45) Date of Patent: Sep. 14, 2021

(54) CONTROL APPARATUS OF SWITCHING POWER SUPPLY FOR GENERATING DRIVE SIGNAL OF INCREMENTAL ON-WIDTH

(71) Applicant: FUJI ELECTRIC CO., LTD., Kawasaki (JP)

(72) Inventors: Jian Chen, Matsumoto (JP); Kiminori Tanaka, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 16/775,604

(22) Filed: Jan. 29, 2020

(65) Prior Publication Data

US 2020/0304017 A1    Sep. 24, 2020

(30) Foreign Application Priority Data

Mar. 18, 2019    (JP) .............................. JP2019-049964

(51) Int. Cl.
*H02M 1/36* (2007.01)
*H02M 3/335* (2006.01)
*H02M 1/15* (2006.01)
*H02M 1/00* (2006.01)

(52) U.S. Cl.
CPC .............. *H02M 1/36* (2013.01); *H02M 1/15* (2013.01); *H02M 3/33569* (2013.01); *H02M 1/0022* (2021.05)

(58) Field of Classification Search
CPC .................. H02M 1/35–37; H02M 3/335–337

USPC ....... 323/222, 223, 271–289; 363/15–18, 25, 363/53, 67, 21.01–21.15, 125–127
See application file for complete search history.

(56) References Cited

U.S. PATENT DOCUMENTS

| | | | | |
|---|---|---|---|---|
| 6,154,375 A | * | 11/2000 | Majid | H02M 1/36 363/16 |
| 7,019,507 B1 | * | 3/2006 | Dittmer | H02M 1/32 323/271 |
| 7,030,596 B1 | * | 4/2006 | Salerno | H02M 3/158 323/282 |
| 7,313,004 B1 | * | 12/2007 | Yang | H02M 3/33523 363/21.02 |
| 7,724,555 B1 | * | 5/2010 | Simopoulos | H02M 3/33592 363/127 |

(Continued)

FOREIGN PATENT DOCUMENTS

| | | |
|---|---|---|
| JP | 2007288979 A | 11/2007 |
| JP | 2008253090 A | 10/2008 |

(Continued)

*Primary Examiner* — Thienvu V Tran
*Assistant Examiner* — Nusrat Quddus
(74) *Attorney, Agent, or Firm* — Rabin & Berdo, P.C.

(57) ABSTRACT

A control apparatus of a current resonance type switching power supply that has a switching element and generates an output voltage. The control apparatus includes a drive circuit configured to generate a drive signal to drive the switching element of the switching power supply, and a soft-start control circuit connected to the drive circuit, the soft-start control circuit being configured to send a signal to the drive circuit to cause the drive circuit to increment an on-width of the drive signal by a prescribed step per prescribed switching number, to thereby reduce an overshoot of the output voltage when the switching power supply is started.

13 Claims, 13 Drawing Sheets

(56) References Cited

U.S. PATENT DOCUMENTS

| | | | |
|---|---|---|---|
| 8,717,001 B2* | 5/2014 | Bernardon | H02J 7/0029 |
| | | | 323/284 |
| 9,929,638 B2 | 3/2018 | Afsharian et al. | |
| 2008/0130328 A1* | 6/2008 | Choi | H02M 3/3376 |
| | | | 363/25 |
| 2009/0134859 A1* | 5/2009 | Shiroyama | H02M 3/33507 |
| | | | 323/282 |
| 2010/0067261 A1 | 3/2010 | Nakanishi | |
| 2011/0266975 A1* | 11/2011 | Yu | H05B 45/3725 |
| | | | 315/307 |
| 2013/0271876 A1 | 10/2013 | Hosotani | |
| 2014/0241018 A1* | 8/2014 | Hwang | H02M 1/32 |
| | | | 363/53 |
| 2014/0376273 A1* | 12/2014 | Hosotani | H02M 1/36 |
| | | | 363/21.02 |
| 2015/0280545 A1* | 10/2015 | Afsharian | H02M 3/33576 |
| | | | 363/21.02 |
| 2016/0057822 A1* | 2/2016 | Chu | H05B 45/20 |
| | | | 315/201 |

FOREIGN PATENT DOCUMENTS

| | | |
|---|---|---|
| JP | 2010057326 A | 3/2010 |
| JP | 2010226917 A | 10/2010 |
| JP | 2012125028 A | 6/2012 |
| JP | 2017077076 A | 4/2017 |
| JP | 2018152974 A | 9/2018 |
| WO | WO2011129185 A1 | 7/2013 |
| WO | 2014074923 A1 | 5/2014 |

* cited by examiner

| Vi [V] | Vi_rank | Ton_min [μs] | Ton_max [μs] | Ton_step [ns] | Nsw_step [cyc] |
|---|---|---|---|---|---|
| 380 | 0 | 0.7 | 12.5 | 30 | 20 |
| 360 | 1 | 0.75 | 13 | 30 | 20 |
| 340 | 2 | 0.8 | 13.5 | 30 | 20 |
| 320 | 3 | 0.85 | 14 | 30 | 20 |
| 300 | 4 | 0.9 | 14.5 | 40 | 20 |
| ⋮ | ⋮ | ⋮ | ⋮ | ⋮ | ⋮ |
| 140 | 13 | 1.35 | 19 | 60 | 20 |
| 120 | 14 | 1.4 | 19.5 | 60 | 20 |
| 100 | 15 | 1.45 | 20 | 60 | 20 |

FIG. 11

CONTROL APPARATUS OF SWITCHING POWER SUPPLY FOR GENERATING DRIVE SIGNAL OF INCREMENTAL ON-WIDTH

CROSS-REFERENCE TO RELATED APPLICATION

This application is based upon and claims the benefit of priority of the prior Japanese Patent Application No. 2019-049964, filed on Mar. 18, 2019, the entire contents of which are incorporated herein by reference.

BACKGROUND OF THE INVENTION

1. Field of the Invention

The embodiments discussed herein are related to a control apparatus of a switching power supply.

2. Background of the Related Art

Being suitable for achieving improved efficiency and a reduced thickness, current resonant type switching power supplies are widely used for liquid crystal display televisions (LCD TVs), alternating current (AC)-direct current (DC) adapters, etc. Such a current resonant type switching power supply includes a soft-start circuit for reducing an overshoot of the output voltage that occurs when the switching power supply is started. Generally, this soft-start circuit performs switching control processing at a high switching frequency first and gradually reduces the switching frequency next based on the output voltage. In this way, the soft-start circuit reduces an overshoot that occurs when the output voltage rapidly rises.

While the switching frequency is controlled based on the output voltage, the output voltage at the time of the startup rises from almost 0 volt (V). For this reason, the switching frequency needed in advance is uncertain at the time of the startup. Thus, it is difficult to generate a smooth rising waveform of the output voltage.

Thus, a circuit that uses a feedback voltage for controlling the output voltage is known as a soft-start circuit (see International Publication Pamphlet No. WO 2014/074923, for example). This soft-start circuit gradually increases the duty cycle of a drive pulse signal applied to switching based on the feedback voltage and gradually reduces the switching frequency during a soft-start period. By gradually changing the duty cycle and the switching frequency, an overshoot of the output voltage that occurs at the time of the startup is reduced.

This soft-start control processing is problematic in that it is not applicable to fast-response switching power supplies that have been developed in recent years. This is because, since the feedback voltage immediately rises when soft-start is performed at the time of the startup, the feedback voltage is not usable as a control signal of the soft-start circuit.

SUMMARY OF THE INVENTION

In one aspect of the embodiments, there is provided a control apparatus of a current resonance type switching power supply that has a switching element and generates an output voltage. The control apparatus includes: a drive circuit configured to generate a drive signal to drive the switching element of the switching power supply; and a soft-start control circuit connected to the drive circuit, the soft-start control circuit being configured to send a signal to the drive circuit to cause the drive circuit to increment an on-width of the drive signal by a prescribed step per prescribed switching number, to thereby reduce an overshoot of the output voltage when the switching power supply is started.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 11 illustrates examples of rank-specific parameter values based on an input voltage;

DETAILED DESCRIPTION OF THE INVENTION

Figure 1:
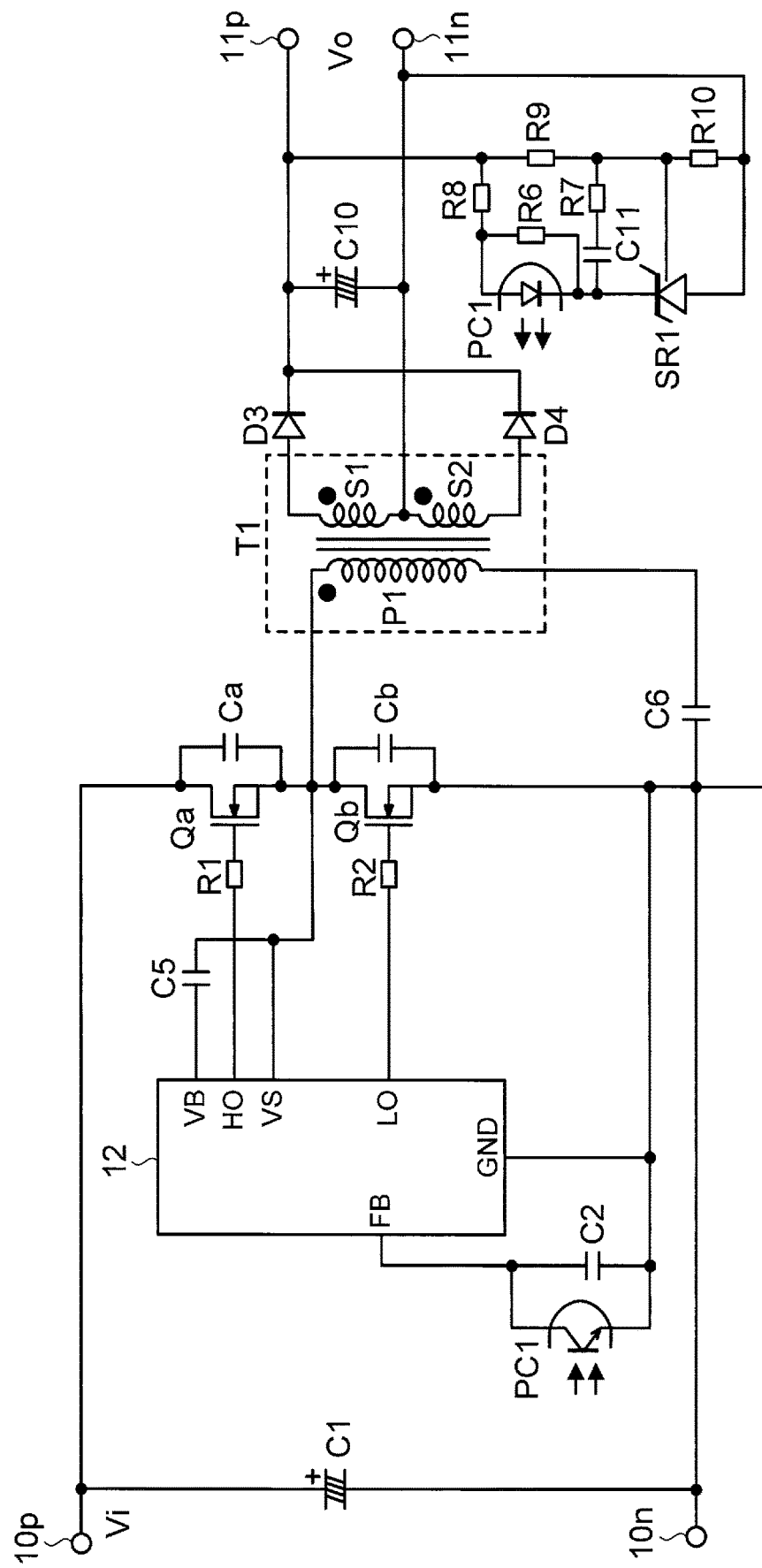
FIG. 1 is a circuit diagram illustrating a configuration example of a switching power supply to which a control apparatus according to a first embodiment is applied.

Embodiments will be described in detail below with reference to the accompanying drawings. An individual embodiment will be described by using an example in which the embodiment is applied to a fast-response LLC current resonant type switching power supply. Among LLC current resonant type switching power supplies that enable fast response, there is a kind that uses current mode control processing and controls power transmission from the primary side to the secondary side of a transformer per switching cycle. In addition, like reference characters refer to like elements throughout the accompanying drawings. In the following description, as appropriate, the name of a terminal and a voltage, a signal, etc. at this terminal will be denoted by the same reference character. An individual embodiment may be implemented by partially combining a plurality of embodiments, as long as the combination does not cause contradiction.

First Embodiment

Figure 2:
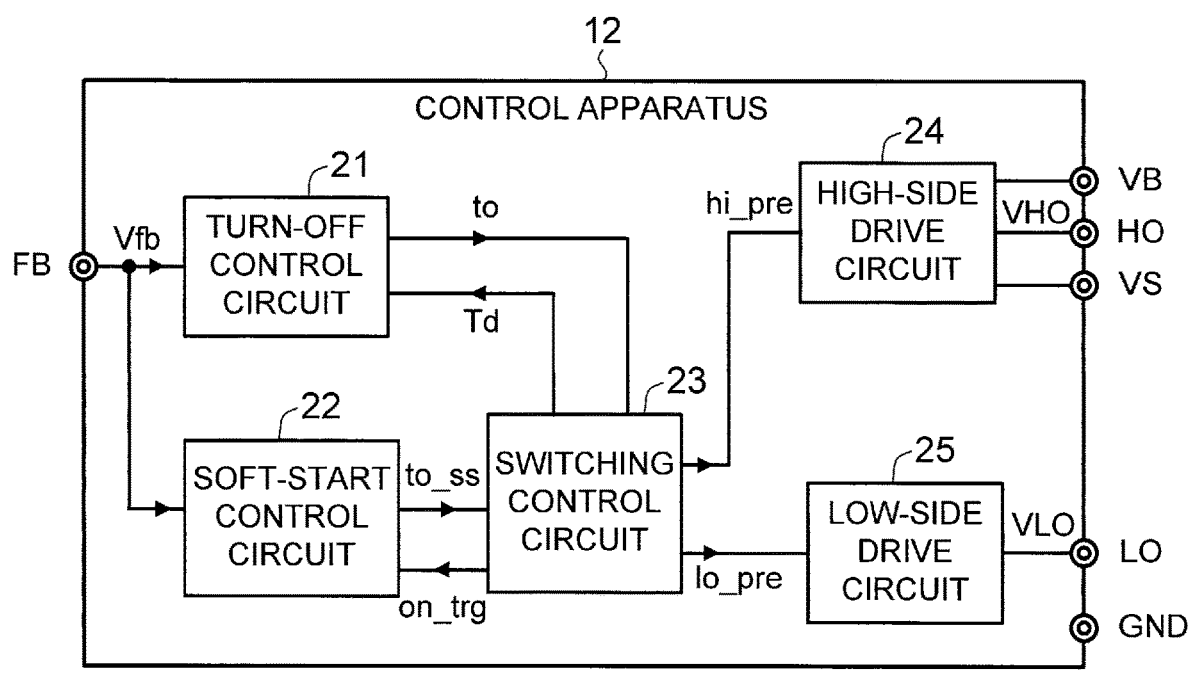
FIG. 2 is a block diagram illustrating a configuration example of the control apparatus according to the first embodiment.

FIG. 1 is a circuit diagram illustrating a configuration example of a switching power supply to which a control apparatus according to a first embodiment is applied. FIG. 2 is a block diagram illustrating a configuration example of the control apparatus according to the first embodiment.

The switching power supply illustrated in FIG. 1 has input terminals 10$p$ and 10$n$ to which a DC input voltage Vi is inputted. The input terminal 10$p$ is connected to a positive terminal of an input capacitor C1, and the input terminal 10$n$ is connected to a negative terminal of the input capacitor C1. The positive and negative terminals of the input capacitor C1 are connected to a half-bridge circuit, which is formed by connecting a high-side switching element Qa and a low-side switching element Qb in series with each other. In this embodiment, N channel metal-oxide-semiconductor field-effect transistors (MOSFETs) are used as the switching elements Qa and Qb.

A common connection point of the switching elements Qa and Qb is connected to one end of a primary winding P1 of a transformer T1, and the other end of the primary winding P1 is grounded via a resonant capacitor C6. The resonant inductance, which is formed by the excitation inductance of the primary winding P1 of the transformer T1 and the leakage inductance between the primary winding P1 and secondary windings S1 and S2, and the resonant capacitor C6 form a resonant circuit. The switching element Qa has a drain terminal and a source terminal connected to a capacitor Ca, and the switching element Qb has a drain terminal and a source terminal connected to a capacitor Cb. The capacitance of these capacitors Ca and Cb is equivalent to the total capacitance of external capacitors, the output capacitance of the MOSFETs, the parasitic capacitance on the positive side and the negative side of the transformer T1, etc.

One end of the secondary winding S1 of the transformer T1 is connected to the anode terminal of a diode D3, and one end of the secondary winding S2 is connected to the anode terminal of a diode D4. The diodes D3 and D4 each have a cathode terminal connected to a positive terminal of an output capacitor C10 and to an output terminal 11$p$. The output capacitor C10 has a negative terminal connected to a common connection point of the secondary windings S1 and S2 and to an output terminal 11$n$. The secondary windings S1 and S2, the diodes D3 and D4, and the output capacitor C10 form an output circuit of the switching power supply. This output circuit converts an AC voltage generated across the secondary windings S1 and S2 into a DC voltage by rectifying and smoothing the AC voltage. The output terminals 11$p$ and 11$n$ are connected to load not illustrated in FIG. 1.

The output terminal 11$p$ is connected to the anode terminal of a light-emitting diode of a photocoupler PC1 via a resistor R8, and the cathode terminal of this light-emitting diode is connected to the cathode terminal of a shunt regulator SR1. A resistor R6 is connected in parallel with the anode terminal and the cathode terminal at both ends of the light-emitting diode. The anode terminal of the shunt regulator SR1 is connected to the output terminal 11$n$. The shunt regulator SR1 has a reference terminal connected to a connection point of resistors R9 and R10 connected in series with each other between the positive terminal and the negative terminal of the output capacitor C10. A series circuit of a resistor R7 and a capacitor C11 is connected between the reference terminal and the cathode terminal of the shunt regulator SR1. This shunt regulator SR1 flows a current based on the difference between an internal reference voltage and a potential obtained by dividing an output voltage Vo (the voltage across the output capacitor C10) through the light-emitting diode. The photocoupler PC1 has a phototransistor whose collector terminal is connected to a terminal FB of a control apparatus 12 formed of an integrated circuit (IC). The emitter terminal of the phototransistor is grounded. A capacitor C2 is connected in parallel with the phototransistor of the photocoupler PC1 between the collector and emitter terminals of the phototransistor. The photocoupler PC1 and the shunt regulator SR1 form a feedback circuit that feeds back an error between the output voltage Vo and the reference voltage to the control apparatus 12.

The control apparatus 12 has a terminal HO connected to the gate terminal of the high-side switching element Qa via a resistor R1, a terminal LO connected to the gate terminal of the low-side switching element Qb via a resistor R2, and a terminal GND connected to ground. The control apparatus 12 also has a terminal VB and a terminal VS connected to a power supply line and a reference potential line of a high-side drive circuit 24. A capacitor C5 is connected between the terminal VB and the terminal VS, and the terminal VS is connected to the common connection point of the switching elements Qa and Qb.

As illustrated in FIG. 2, the control apparatus includes a turn-off control circuit 21, a soft-start control circuit 22, a switching control circuit 23, the high-side drive circuit 24, and a low-side drive circuit 25.

The terminal FB of the control apparatus 12 is connected to input terminals of the turn-off control circuit 21 and the soft-start control circuit 22 and is supplied with a feedback voltage Vfb. The turn-off control circuit 21 receives a signal Td from the switching control circuit 23 and supplies a turn-off signal to the switching control circuit 23. The soft-start control circuit 22 receives an on-trigger signal on_trg from the switching control circuit 23 and supplies a soft-start turn-off signal to_ss to the switching control circuit 23.

The switching control circuit 23 supplies a high-side drive signal hi_pre to the high-side drive circuit 24 and supplies a low-side drive signal lo_pre to the low-side drive circuit 25.

The high-side drive circuit 24 is connected to the terminal VB and the terminal VS that constitute a high-side power supply and is connected to the terminal HO that outputs a high-side drive signal VHO. The low-side drive circuit 25 is connected to the terminal LO that outputs a low-side drive signal VLO.

In this control apparatus 12, the switching control circuit 23 generates the high-side drive signal hi_pre and the low-side drive signal lo_pre. The high-side drive signal hi_pre and the low-side drive signal lo_pre alternately turn on the high-side switching element Qa and the low-side switching element Qb. Upon receiving the turn-off signal to from the turn-off control circuit 21 and the soft-start turn-off signal to_ss from the soft-start control circuit 22, the switching control circuit 23 generates the signal Td that represents time during which the high-side drive signal hi_pre and the low-side drive signal lo_pre are turned off and an on-trigger signal on_trg that represents timing at which the high-side drive signal hi_pre and the low-side drive signal lo_pre rise.

When the switching power supply is started, the switching control circuit 23 receives the soft-start turn-off signal to_ss from the soft-start control circuit 22 and sets the pulses of the high-side drive signal hi_pre and the low-side drive signal lo_pre to off. In a normal operation, the switching control circuit 23 receives the turn-off signal to from the turn-off control circuit 21 and sets the pulses of the high-side drive signal hi_pre and the low-side drive signal lo_pre to off.

The soft-start control circuit 22 performs control processing such that the generation timing of the soft-start turn-off signal to_ss that determines the widths of the pulses of the high-side drive signal hi_pre and the low-side drive signal lo_pre is gradually delayed. Specifically, by delaying the generation timing of the soft-start turn-off signal to_ss by a predetermined incremental on-width per predetermined switching number, the soft-start control circuit 22 increases the on-widths of the pulses. In this way, soft-start is achieved without regard to the response speed of the switching power supply. Thus, it is possible to reduce an overshoot of the output voltage that occurs when the switching power supply is started. The soft-start control circuit 22 may maintain the duty cycle in this operation, irrespective of the increase based on the switching number. In this way, it is possible to reduce the possibility of off-resonance of the switching power supply.

Next, specific configuration examples of the turn-off control circuit 21, the soft-start control circuit 22, and the switching control circuit 23 will be described.

Figure 3:
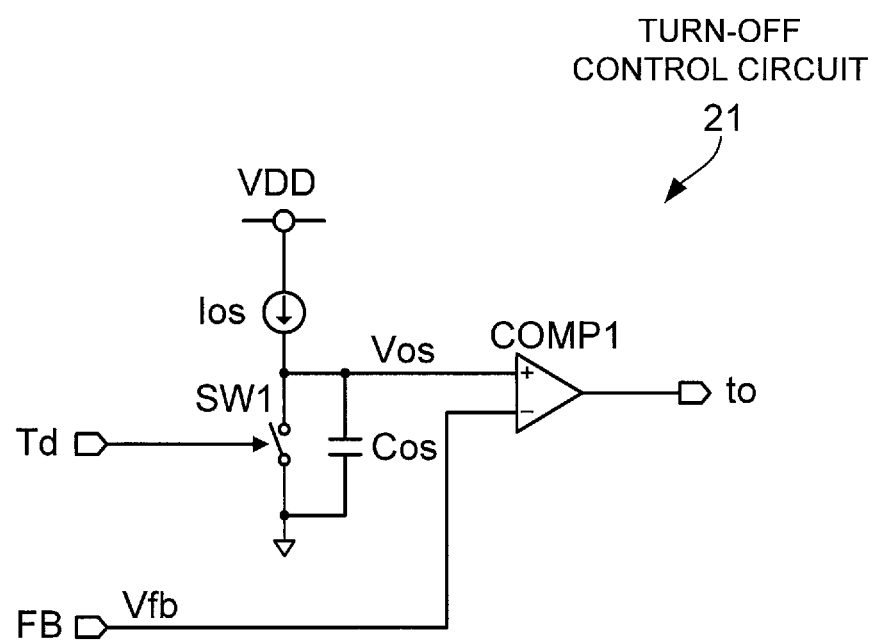
FIG. 3 is a circuit diagram illustrating a configuration example of a turn-off control circuit.
Figure 4:
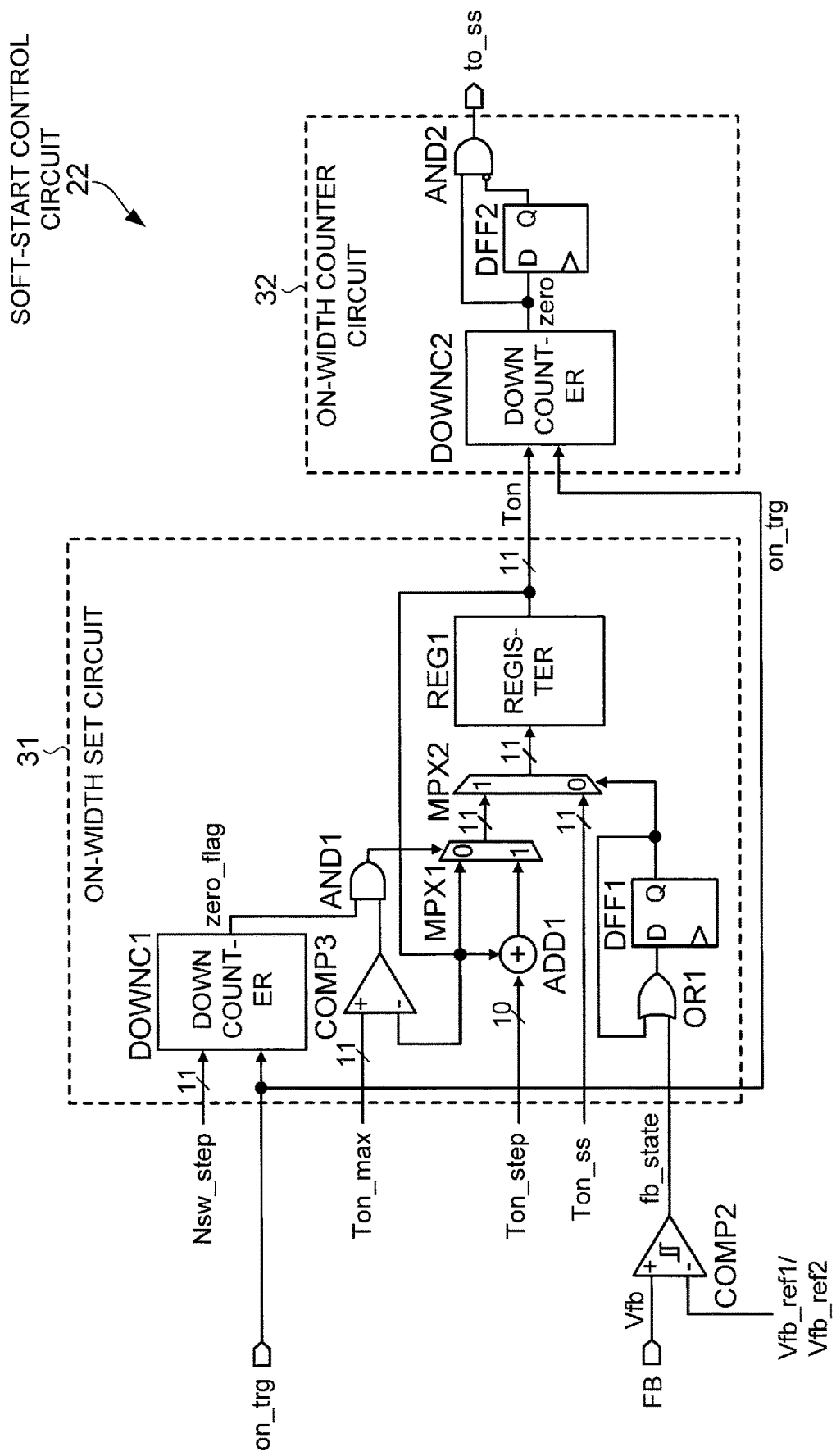
FIG. 4 is a circuit diagram illustrating a configuration example of a soft-start control circuit.
Figure 5:
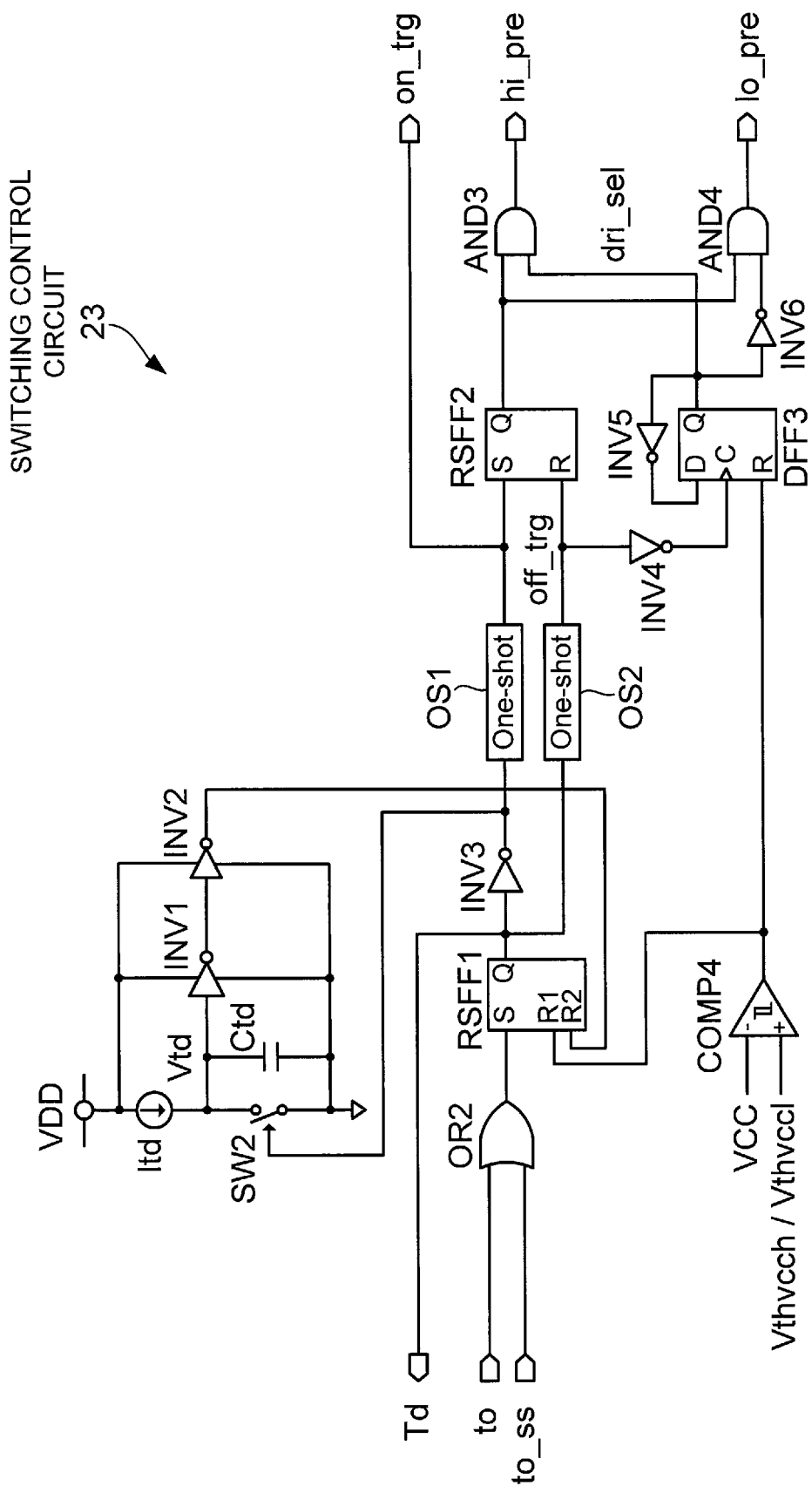
FIG. 5 is a circuit diagram illustrating a configuration example of a switching control circuit.

FIG. 3 is a circuit diagram illustrating a configuration example of the turn-off control circuit 21. FIG. 4 is a circuit diagram illustrating a configuration example of the soft-start control circuit 22. FIG. 5 is a circuit diagram illustrating a configuration example of the switching control circuit 23.

As illustrated in FIG. 3, the turn-off control circuit 21 has a terminal FB, a terminal Td, and a terminal to. The terminal FB is connected the inverting input terminal of a comparator COMP1. The non-inverting input terminal of the comparator COMP1 is connected to a connection point of one end of a constant current source Ios and one end of a capacitor Cos and receives a charging voltage Vos of the capacitor Cos. The other terminal of the constant current source Ios receives a voltage VDD, and the other terminal of the capacitor Cos is grounded. The capacitor Cos is connected in parallel with a switch SW1 having a control terminal connected to the terminal Td. In addition, the comparator COMP1 has an output terminal connected to the terminal to.

This turn-off control circuit 21 constitutes a circuit that determines the on-width of the high-side drive signal hi_pre and the low-side drive signal lo_pre, namely, the turn-off timing. Note that the turn-off signal to outputted to the terminal to is ignored in a soft-start period in the switching control circuit 23 and becomes effective in a normal operation after the soft-start ends.

When the turn-off control circuit 21 receives a high (H) level signal Td that indicates the turn-off timing (dead time) of the high-side drive signal hi_pre and the low-side drive signal lo_pre from the switching control circuit 23, the switch SW1 is set to be on (conductive). In this state, the capacitor Cos discharges. The timing at which the signal Td drops to an L level is determined by a circuit that determines the dead time described below.

When the signal Td drops to an L level, the switch SW1 is set to be off (cut off), and the capacitor Cos begins charging. As a result, the charging voltage Vos rises. When the charging voltage Vos rises and exceeds the feedback voltage Vfb, the comparator COMP1 outputs an H-level turn-off signal to to the terminal to.

As described above, the turn-off control circuit 21 outputs an H-level turn-off signal to at timing that is delayed by a period of time based on the feedback voltage Vfb from the input of an L-level signal Td. Since the feedback voltage Vfb is very high in a soft-start period, the turn-off signal to rises to an H level with a long delay. However, the turn-off signal to rises to an H level with a short delay based on the feedback voltage Vfb after the soft-start period elapses.

As illustrated in FIG. 4, the soft-start control circuit 22 has a terminal FB, a terminal on_trg, and a terminal to_ss and includes a hysteresis comparator COMP2, an on-width set circuit 31, and an on-width counter circuit 32.

The terminal FB is connected to the non-inverting input terminal of the hysteresis comparator COMP2 and supplies the feedback voltage Vfb. The hysteresis comparator COMP2 has an inverting input terminal to which two reference voltages Vfb_ref1 and Vfb_ref2 (Vfb_ref1>Vfb_ref2) are applied.

The on-width set circuit 31 includes a down counter DOWNC1 that counts a predetermined switching number. When an incremental switching number signal Nsw_step previously set as an initial value is inputted to the down counter DOWNC1, an incremental switching number is set in the down counter DOWNC1. Each time the down counter DOWNC1 receives the on-trigger signal on_trg, the down counter DOWNC1 decrements the initial value. During this decrementing, the down counter DOWNC1 outputs an L-level zero flag signal zero_flag. When the initial value reaches 0, the down counter DOWNC1 outputs an H-level zero flag signal zero_flag, and the initial value is set in the down counter DOWNC1, again.

The output terminal of the down counter DOWNC1 is connected to one input terminal of an AND circuit AND1, and the other input terminal of the AND circuit AND1 is connected to the output terminal of a digital comparator COMP3. The output terminal of the AND circuit AND1 is connected to the control terminal of a multiplexer circuit MPX1.

The digital comparator COMP3 has a non-inverting input terminal that receives a maximum on-width signal Ton_max. The digital comparator COMP3 has an inverting input terminal that is connected to one input terminal of an adder circuit ADD1, a first input terminal of the multiplexer circuit MPX1, and the output terminal of a register REG1. The other input terminal of the adder circuit ADD1 receives a step signal Ton_step, and the output terminal of the adder circuit ADD1 is connected to a second input terminal of the multiplexer circuit MPX1.

A first input terminal of a multiplexer circuit MPX2 receives a start on-width signal Ton_ss, and a second input terminal of the multiplexer circuit MPX2 is connected to the output terminal of the multiplexer circuit MPX1. The output terminal of the multiplexer circuit MPX2 is connected to the input terminal of the register REG1.

Each of the multiplexer circuits MPX1 and MPX2 is a circuit that selects one of the signals inputted to its first input terminal indicated by "0" and its second input terminal indicated by "1". More specifically, when an L-level signal is inputted to the control terminal, the signal inputted to the first input terminal is selected and outputted. In contrast, when an H-level signal is inputted to the control terminal, the signal inputted to the second input terminal is selected and outputted.

The on-width set circuit 31 also includes an OR circuit OR1 having one input terminal that is connected to the output terminal of the hysteresis comparator COMP2 and that receives a feedback state signal fb_state. The OR circuit OR1 has an output terminal connected to an input terminal of a D flip-flop DFF1 having an output terminal connected to the other input terminal of the OR circuit OR1 and the control terminal of the multiplexer circuit MPX2.

The OR circuit OR1 and the D flip-flop DFF1 constitute a self-holding circuit. More specifically, when the one input terminal of the OR circuit OR1 receives an H-level feedback state signal fb_state and then the D flip-flop DFF1 receives a clock signal, the D flip-flop DFF1 is set and outputs an H-level signal. This H-level signal is fed back to the other input terminal of the OR circuit OR1, and the H-level signal is always inputted to the D flip-flop DFF1. In this way, even when the feedback state signal fb_state drops to an L level from an H level, the multiplexer circuit MPX2 does not select the start on-width signal Ton_ss set as the initial value.

When an L-level feedback state signal fb_state is inputted to the OR circuit OR1 immediately after the switching power supply is started, an L-level signal is inputted to the control terminal of the multiplexer circuit MPX2. Therefore, the multiplexer circuit MPX2 selects the start on-width signal Ton_ss inputted to its first input terminal. Consequently, the start on-width signal Ton_ss is stored in the register REG1 as an initial value. The start on-width signal Ton_ss is stored only once when the switching power supply is started.

When an H-level feedback state signal fb_state is subsequently inputted and the D flip-flop DFF1 is set, an H-level signal is inputted to the control terminal of the multiplexer circuit MPX2, and the multiplexer circuit MPX2 selects the output signal of the multiplexer circuit MPX1.

Since the value stored in the register REG1 is sufficiently less than that of the maximum on-width signal Ton_max in a soft-start period, the digital comparator COMP3 outputs an H-level signal and enables the AND circuit AND1. When the value stored in the register REG1 exceeds the value of the maximum on-width signal Ton_max, the digital comparator COMP3 outputs an L-level signal to disable the AND circuit AND1. In this case, since the AND circuit AND1 outputs the L-level signal, the multiplexer circuit MPX2 fixedly selects its first input terminal.

When the down counter DOWNC1 outputs an L-level zero flag signal zero_flag, the AND circuit AND1 outputs an L-level signal. Therefore, the multiplexer circuit MPX1 selects the value stored in the register REG1 and outputs the value to the multiplexer circuit MPX2. The on-width signal Ton stored in the register REG1 via the multiplexer circuit MPX2 is outputted to the on-width counter circuit 32.

In contrast, when the down counter DOWNC1 ends its decrementing processing and outputs an H-level zero flag signal zero_flag, the multiplexer circuit MPX1 selects the sum obtained by the adder circuit ADD1 and outputs this sum to the multiplexer circuit MPX2. In this case, since the multiplexer circuit MPX2 selects the output signal of the multiplexer circuit MPX1, the signal outputted by the adder circuit ADD1 is inputted to and stored in the register REG1. The adder circuit ADD1 outputs a value obtained by adding the value of the step signal Ton_step to the value stored in the register REG1 when the zero flag signal zero_flag is at an L level. The term "step" used in the step signal Ton_step refers to the increment of the on-width in soft-start.

When receiving the next on-trigger signal on_trg, the down counter DOWNC1 decrements the initial value. Since the down counter DOWNC1 performs decrementing processing, the down counter DOWNC1 outputs an L-level zero flag signal zero_flag. Consequently, the multiplexer circuit MPX1 selects its first input terminal, the multiplexer circuit MPX2 selects its second input terminal, and the register REG1 maintains the newly stored signal.

Next, the on-width signal Ton in the register REG1 set by the on-width set circuit 31 is outputted to the on-width counter circuit 32. The on-width counter circuit 32 includes a down counter DOWNC2, a D flip-flop DFF2, and an AND circuit AND2.

The down counter DOWNC2 receives the on-width signal Ton and the on-trigger signal on_trg. Each time the down counter DOWNC2 receives the on-trigger signal on_trg, the down counter DOWNC2 decrements the value of the on-width signal Ton. The down counter DOWNC2 outputs a signal zero that is an L level during the decrementing of the on-width signal Ton and that rises to an H level when the value of the on-width signal Ton reaches 0.

The down counter DOWNC2 has an output terminal connected to the input terminal of the D flip-flop DFF2 and the positive-logic input terminal of the AND circuit AND2. The D flip-flop DFF2 has an output terminal connected to the negative-logic input terminal of the AND circuit AND2, and the AND circuit AND2 has an output terminal connected to the terminal to_ss.

The D flip-flop DFF2 and the AND circuit AND2 constitute a one-shot circuit. When the down counter DOWNC2 outputs an L-level signal zero, the D flip-flop DFF2 outputs an L-level signal, and the AND circuit AND2 is therefore enabled. Thus, the pulse of the soft-start turn-off signal to_ss rises when the value of the down counter DOWNC2 drops to 0 (zero=H) and falls when the initial clock signal is subsequently inputted to the D flip-flop DFF2. This soft-start turn-off signal to_ss is outputted to the switching control circuit 23.

As illustrated in FIG. 5, the switching control circuit 23 has a terminal Td, a terminal to, a terminal to_ss, a terminal on_trg, a terminal hi_pre, and a terminal lo_pre. The switching control circuit 23 includes an OR circuit OR2 having one input terminal connected to the terminal to and the other input terminal connected to the terminal to_ss. In addition, the OR circuit OR2 has an output terminal connected to a set input terminal of a reset priority RS flip-flop RSFF1.

The RS flip-flop RSFF1 has an output terminal connected to the terminal Td, the input terminal of an inverter circuit INV3, and the input terminal of a one-shot circuit OS2. The inverter circuit INV3 has an output terminal connected to the input terminal of a one-shot circuit OS1.

The output terminal of the inverter circuit INV3 is connected to the control terminal of a switch SW2. The switch SW2 has one end connected to one end of a constant current source Itd, one end of a capacitor Ctd, and the input terminal of an inverter circuit INV1 that receives a charging voltage Vtd of the capacitor Ctd. The other terminal of the constant current source Itd is connected to a line of the voltage VDD, and the other terminal of the capacitor Ctd and the other terminal of the switch SW2 are grounded. The inverter circuit INV1 has an output terminal connected to the input terminal of an inverter circuit INV2 having an output terminal connected to a second reset input terminal of the RS flip-flop RSFF1.

The constant current source Itd, the switch SW2, the capacitor Ctd, and the inverter circuits INV1 and INV2 constitute the circuit that determines the dead time described above.

The RS flip-flop RSFF1 has a first reset input terminal connected to the output terminal of a hysteresis comparator COMP4. The hysteresis comparator COMP4 has an inverting input terminal that receives a power supply voltage VCC of the control apparatus 12 and has a non-inverting input terminal that receives threshold voltages Vthvcch and Vthvccl. This hysteresis comparator COMP4 constitutes an under-voltage lock-out (UVLO) circuit that prevents an abnormal operation when the voltage VCC drops below a voltage at which internal circuits of the control apparatus 12 are operable.

The one-shot circuit OS1 has an output terminal connected to the set input terminal of an RS flip-flop RSFF2 and the terminal on_trg. The one-shot circuit OS1 generates the on-trigger signal on_trg that rises in synchronization with a falling edge of the signal Td. The one-shot circuit OS2 has an output terminal connected to the reset input terminal of the RS flip-flop RSFF2. The RS flip-flop RSFF2 has an output terminal connected to one input terminal of an AND circuit AND3 and one input terminal of an AND circuit AND4.

The output terminal of the one-shot circuit OS2 is also connected to the input terminal of an inverter circuit INV4 having an output terminal connected to the clock input terminal of a D flip-flop DFF3. The one-shot circuit OS2 generates an off-trigger signal off_trg that rises in synchronization with a rising edge of the signal Td. The D flip-flop DFF3 has an input terminal connected to the output terminal of an inverter circuit INV5 having an input terminal connected to the output terminal of the D flip-flop DFF3. The output terminal of the D flip-flop DFF3 is also connected to the other input terminal of the AND circuit AND3 and the input terminal of an inverter circuit INV6 and outputs a drive selection signal dri_sel. The inverter circuit INV6 has an output terminal connected to the other input terminal of the AND circuit AND4. The AND circuit AND3 has an output terminal that is connected to the terminal hi_pre and that outputs the high-side drive signal hi_pre. The AND circuit AND4 has an output terminal that is connected to the terminal lo_pre and that outputs the low-side drive signal lo_pre. The D flip-flop DFF3 has a reset input terminal connected to the output terminal of the hysteresis comparator COMP4.

When the switching power supply is started, this switching control circuit 23 receives the soft-start turn-off signal to_ss from the soft-start control circuit 22 and sets the pulses of the high-side drive signal hi_pre and the low-side drive signal lo_pre to off. In addition, in a normal operation, the switching control circuit 23 receives the turn-off signal to from the turn-off control circuit 21 and sets the pulses of the high-side drive signal hi_pre and the low-side drive signal lo_pre to off. This signifies that, between the soft-start turn-off signal to_ss and the turn-off signal to that are inputted to the OR circuit OR2, the soft-start turn-off signal to_ss is outputted when the switching power supply is started, namely, in a soft-start period, and the turn-off signal to is outputted preferentially in a normal operation, namely, in a non-soft-start period. This is because, in a normal operation, namely, in a non-soft-start period, the feedback voltage Vfb has already dropped, and the input of the inverting input terminal of the comparator COMP1 has already dropped.

When the turn-off signal to or the soft-start turn-off signal to_ss is inputted to the OR circuit OR2, the output signal of the OR circuit OR2 rises to an H level, and the RS flip-flop RSFF1 is set. As a result, the RS flip-flop RSFF1 outputs an H-level signal Td. This signal Td is inputted to the one-shot circuit OS2, and the one-shot circuit OS2 outputs the off-trigger signal off_trg that rises in synchronization with a rising edge of the signal Td and resets the RS flip-flop RSFF2. Consequently, since an L-level signal is supplied to one input terminal of each of the AND circuits AND3 and AND4, the high-side drive signal hi_pre and the low-side drive signal lo_pre outputted by the respective AND circuits AND3 and AND4 drop to an L level.

In this case, since the output of the inverter circuit INV3 drops to an L level, the switch SW2 is set to be off (cut off), the capacitor Ctd begins charging, and the charging voltage Vtd begins to rise. When the charging voltage Vtd rises and exceeds a threshold voltage of the inverter circuit INV1 (when the dead time elapses), the output of the inverter circuit INV1 drops to an L level, and the output of the inverter circuit INV2 rises to an H level. This H-level signal resets the RS flip-flop RSFF1, and the output signal Td of the RS flip-flop RSFF1 drops to an L level.

This L-level signal Td is logically inverted by the inverter circuit INV3 and is then inputted to the one-shot circuit OS1. Consequently, the one-shot circuit OS1 outputs the on-trigger signal on_trg having a predetermined on-width. This on-trigger signal on_trg rises in synchronization with a rising edge of the output signal of the inverter circuit INV3, namely, with a falling edge of the signal Td. The on-trigger signal on_trg sets the RS flip-flop RSFF2, and the RS flip-flop RSFF2 supplies an H-level signal to one input terminal of each of the AND circuits AND3 and AND4.

In this case, the D flip-flop DFF3 outputs the drive selection signal dri_sel. When the drive selection signal dri_sel is at an H level, the AND circuit AND3 outputs the high-side drive signal hi_pre. When the drive selection signal dri_sel is at an L level, the AND circuit AND4 outputs the low-side drive signal lo_pre. This D flip-flop DFF3 switches the logic state of the drive selection signal dri_sel each time the RS flip-flop RSFF2 is reset.

In addition, when the RS flip-flop RSFF1 is reset by the circuit that determines the dead time, the signal Td drops to an L level and causes the turn-off control circuit 21 to start generating the turn-off signal to. In this case, since the output signal of the inverter circuit INV3 rises to an H level, the switch SW2 is set to be on (conductive), the capacitor Ctd discharges, and the value that determines the dead time is cleared.

When the turn-off signal to or the soft-start turn-off signal to_ss is next inputted to the OR circuit OR2, the RS flip-flop RSFF1 is set, and the one-shot circuit OS2 outputs the off-trigger signal off_trg having a short on-width. This off-trigger signal off_trg is logically inverted by the inverter circuit INV4 and is then inputted to the clock input terminal of the D flip-flop DFF3. Consequently, the D flip-flop DFF3 latches the output state of the inverter circuit INV5 in synchronization with a falling edge of the off-trigger signal off_trg. More specifically, when the output state of the D flip-flop DFF3 is at an L-level, the D flip-flop DFF3 latches an H-level signal and outputs an H-level drive selection signal dri_sel. In contrast, when the output state of the D flip-flop DFF3 is at an H-level, the D flip-flop DFF3 latches the L-level signal that has been logically inverted by the inverter circuit INV5 and outputs an L-level drive selection signal dri_sel.

When the hysteresis comparator COMP4 detects an abnormal drop of the voltage VCC, the hysteresis comparator COMP4 outputs an H-level signal and forcibly resets the RS flip-flop RSFF1 and the D flip-flop DFF3.

Next, an operation of the soft-start control circuit 22 will be described in more detail.

Figure 6:
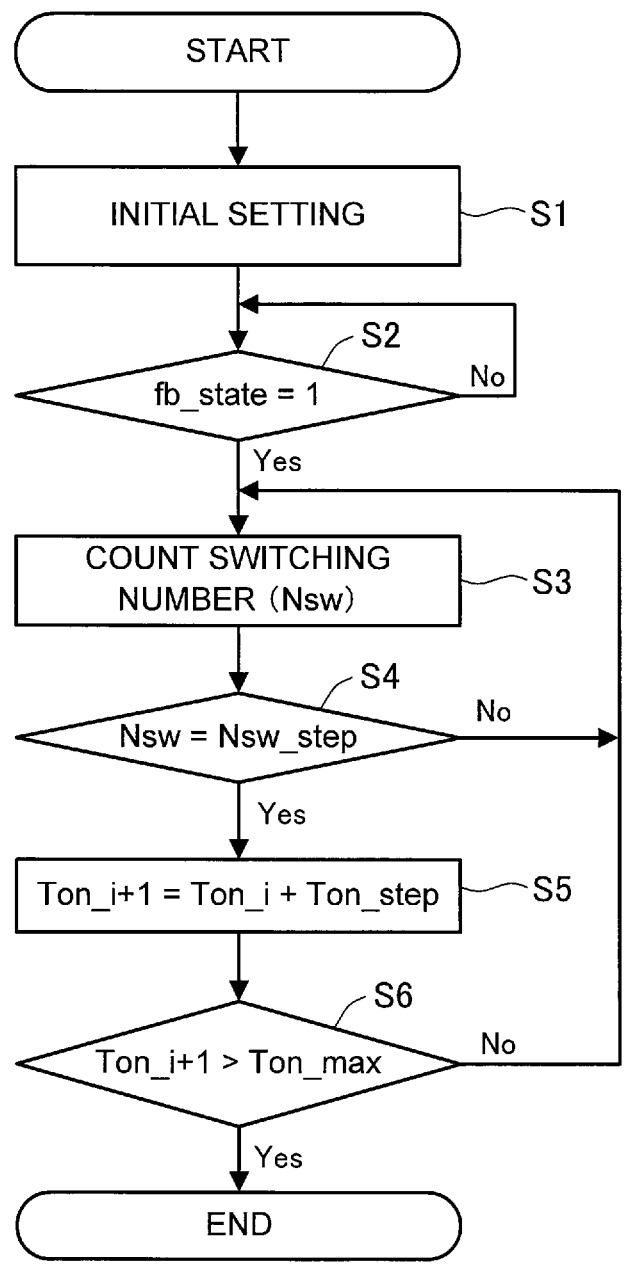
FIG. 6 is a flowchart illustrating an operation of an on-width set circuit in the soft-start control circuit.
Figure 7:
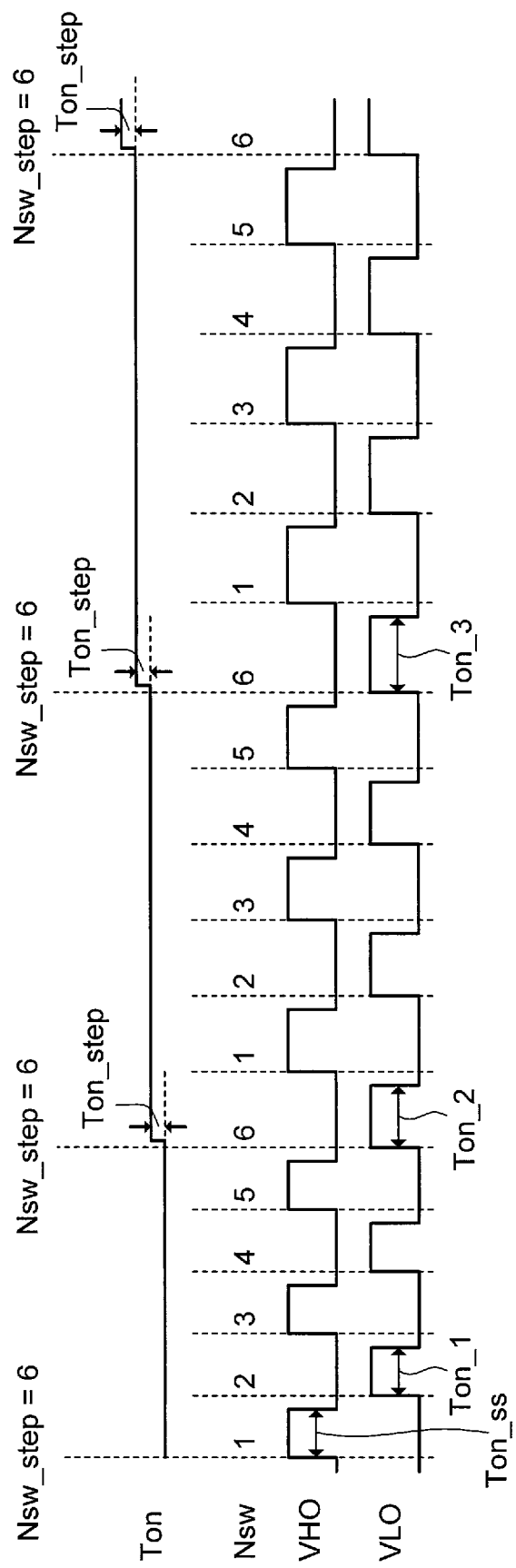
FIG. 7 is a time chart illustrating change in on-width.
Figure 8:
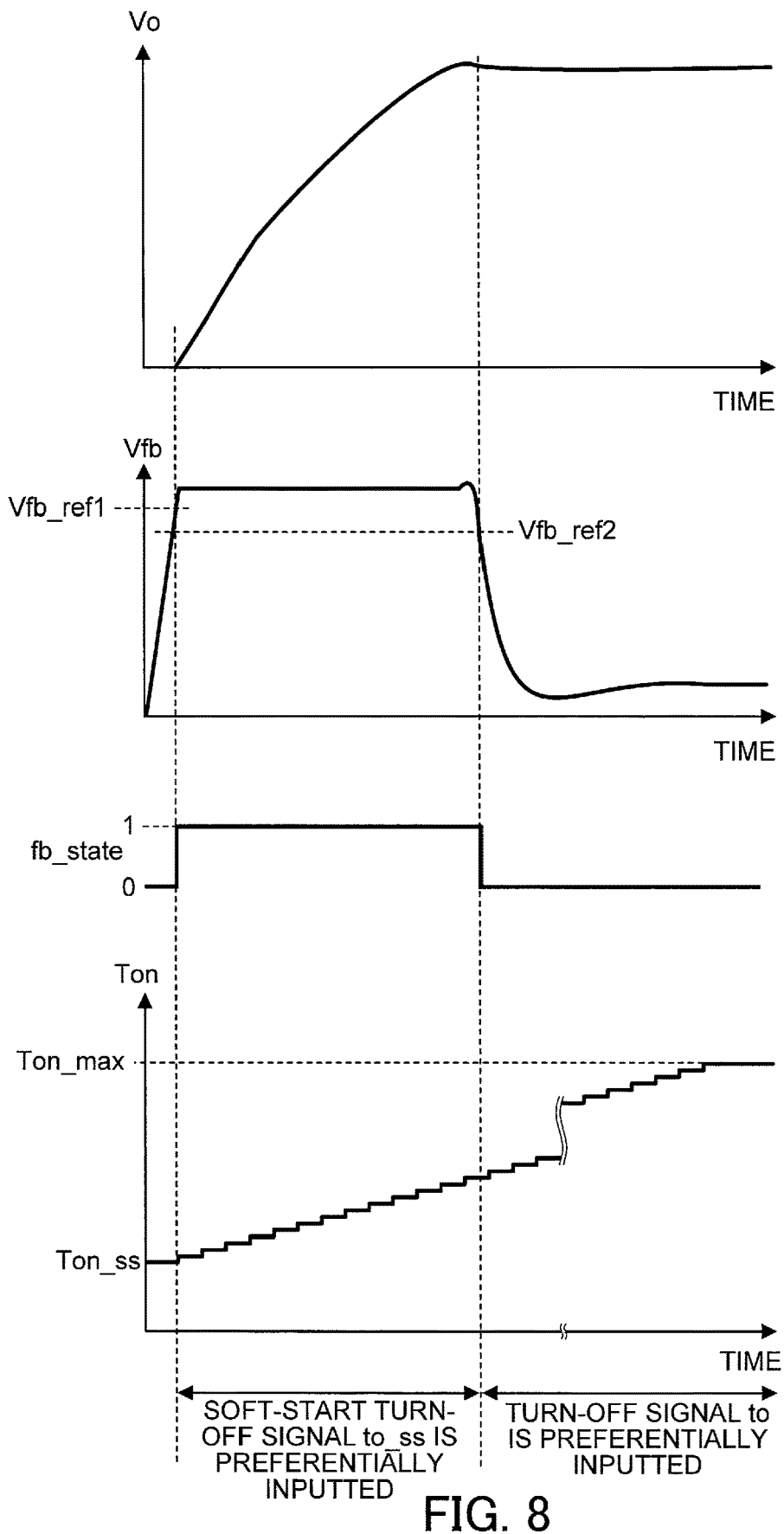
FIG. 8 illustrates waveforms of main portions of the switching power supply.

FIG. 6 is a flowchart illustrating an operation of the on-width set circuit 31 in the soft-start control circuit 22. FIG. 7 is a time chart illustrating change in on-width. FIG. 8 illustrates waveforms of main portions of the switching power supply. FIG. 8 illustrates, from top to bottom, change in the output voltage Vo, the feedback voltage Vfb, the feedback state signal fb_state, and the on-width signal Ton over time.

When the switching power supply is started and the soft-start is started, as illustrated in FIG. 6, first, initial setting is performed in the on-width set circuit (step S1). More specifically, predetermined values are assigned to the incremental switching number signal Nsw_step, the maximum on-width signal Ton_max, the step signal Ton_step, and the start on-width signal Ton_ss. The initial value of the start on-width signal Ton_ss is set as Ton_1. The following description assumes that, as an example, "6" is set by the incremental switching number signal Nsw_step. As illustrated in FIG. 7, Ton_1 corresponds to the on-width of the high-side drive signal VHO and the low-side drive signal VLO at the time of the startup. In addition, immediately after the switching power supply is started, as illustrated in FIG. 8, the output voltage Vo is 0 V, and the feedback voltage Vfb rapidly rises, and the feedback state signal fb_state is at an L-level "0". Thus, the multiplexer circuit MPX2 selects the input of the start on-width signal Ton_ss and stores the start on-width signal Ton_ss in the register REG1 as the on-width signal Ton.

Next, the on-width set circuit 31 waits until the feedback state signal fb_state rises to an H-level "1" (step S2). As illustrated in FIG. 8, the feedback state signal fb_state rises to "1" when the feedback voltage Vfb exceeds the reference voltage Vfb_ref1.

When the feedback state signal fb_state rises to "1", the multiplexer circuit MPX2 in the on-width set circuit 31 selects the output of the multiplexer circuit MPX1, and the down counter DOWNC1 counts the switching number Nsw (step S3). Initially, since the down counter DOWNC1 outputs an L-level zero flag signal zero_flag, the AND circuit AND1 outputs an L level signal, and the multiplexer circuit MPX1 selects the output of the register REG1.

Next, the on-width set circuit 31 determines whether the switching number Nsw has reached the value set by the incremental switching number signal Nsw_step as a result of the counting of the down counter DOWNC1 (step S4). In this example, "6" is set by the incremental switching number signal Nsw_step. Thus, if the switching number Nsw, which the down counter DOWNC1 counts while decrementing from "6", has not reached 6, the processing returns to step S3.

If the switching number Nsw counted by the down counter DOWNC1 has reached "6" and if the down counter DOWNC1 outputs a zero_flag indicating 1, the on-width set circuit 31 assigns "Ton_i+Ton_step" to "Ton_i+1" (i is a positive integer) (step S5). More specifically, in this case, since the multiplexer circuit MPX1 selects the output of the adder circuit ADD1, the on-width signal Ton is updated to the value obtained by incrementing the value of the on-width stored in the register REG1 by the value of the step signal Ton_step.

Next, the on-width set circuit 31 determines whether the incremented Ton_i+1 has exceeded the value of the maximum on-width signal Ton_max (step S6). If the Ton_i+1 has exceeded the value of the maximum on-width signal Ton_max, the on-width set circuit 31 ends the operation of updating the on-width signal to the value obtained by incrementing the value of the on-width stored in the register REG1 by the value of the step signal Ton_step.

In step S6, if Ton_i+1 has not exceeded the value of the maximum on-width signal Ton_max, the processing returns to step S3, and the down counter DOWNC1 in the on-width set circuit 31 counts the switching number Nsw.

As described above, the on-width set circuit 31 first sets the start on-width signal Ton_ss and turns on the switching elements Qa and Qb with the on-width of the start on-width signal Ton_ss, as illustrated FIG. 7. In this case, when the down counter DOWNC1 counts the switching number Nsw to "6" set by the incremental switching number signal Nsw_step, the on-width of the on-width signal Ton is incremented by the value of the step signal Ton_step. Namely, Ton_1 is changed to Ton_2. Next, each time the down counter DOWNC1 counts the switching number Nsw to "6", the value of the on-width is incremented by the step signal Ton_step.

The reason why the on-width is increased per preset switching number Nsw is that, even when a fast-response switching power supply is used, the clock frequency needs to be significantly increased to accurately generate an optimum step signal Ton_step for soft-start.

As illustrated in FIG. 8, regardless of the operation of updating the on-width signal to a value obtained by incrementing the value of the on-width stored in the register REG1 by the value of the step signal Ton_step, the feedback state signal fb_state drops to "0" based on the feedback voltage Vfb, and the soft-start is ended. More specifically, when the feedback voltage Vfb drops, the turn-off signal to is outputted by the turn-off control circuit 21 based on the feedback voltage Vfb, earlier than the soft-start turn-off signal to_ss. Thus, in this case, since the turn-off signal to outputted by the turn-off control circuit 21 is preferentially inputted to the switching control circuit 23, the soft-start is ended at this timing.

Since the control apparatus of the switching power supply uses the switching number Nsw to control the increment of the on-width in soft-start, no soft-start output voltage detection circuit is needed, and the fast-response switching power supply achieves reduction in an overshoot.

Second Embodiment

Figure 9:
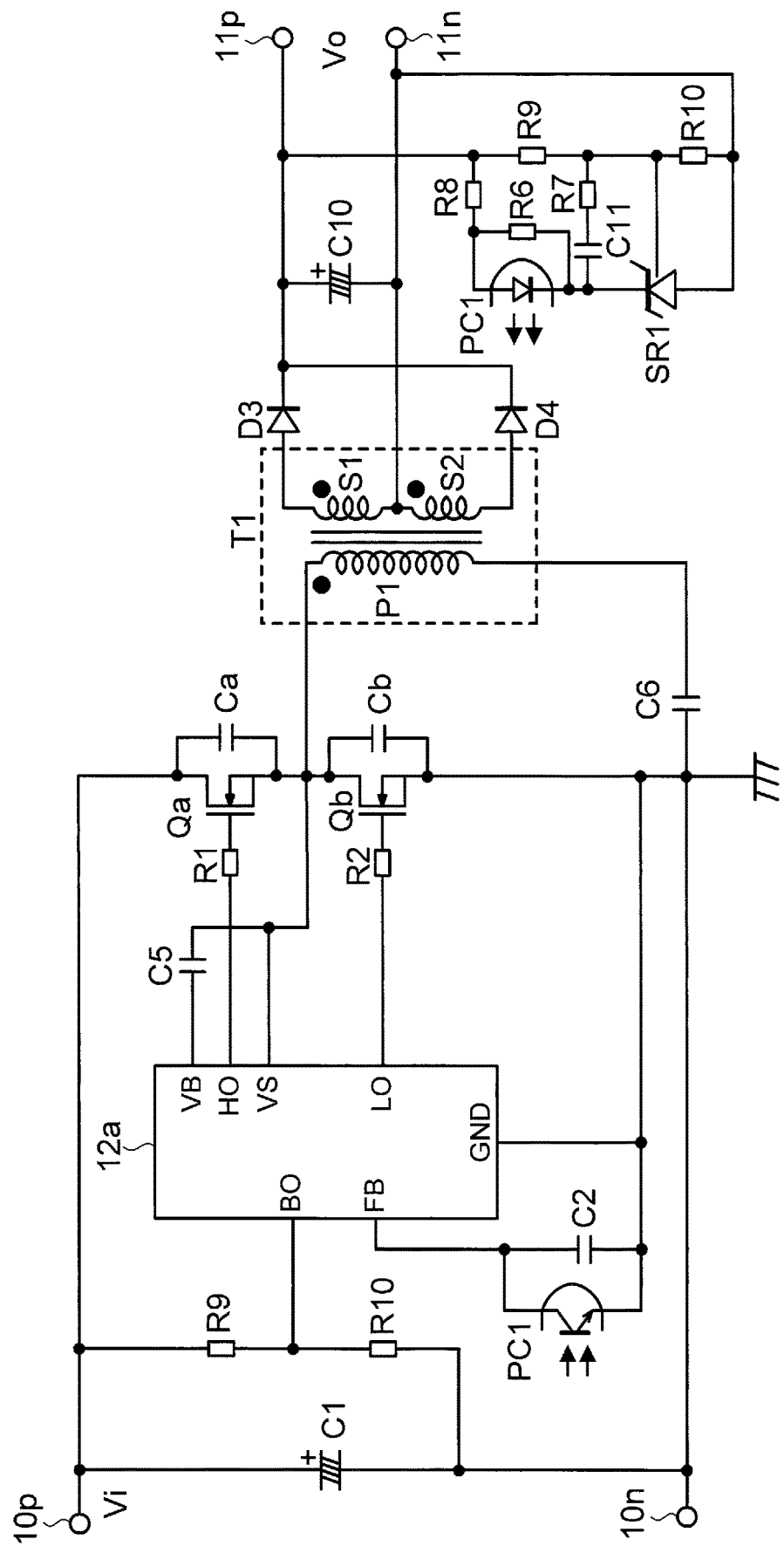
FIG. 9 is a circuit diagram illustrating a configuration example of a switching power supply to which a control apparatus according to a second embodiment is applied.
Figure 10:
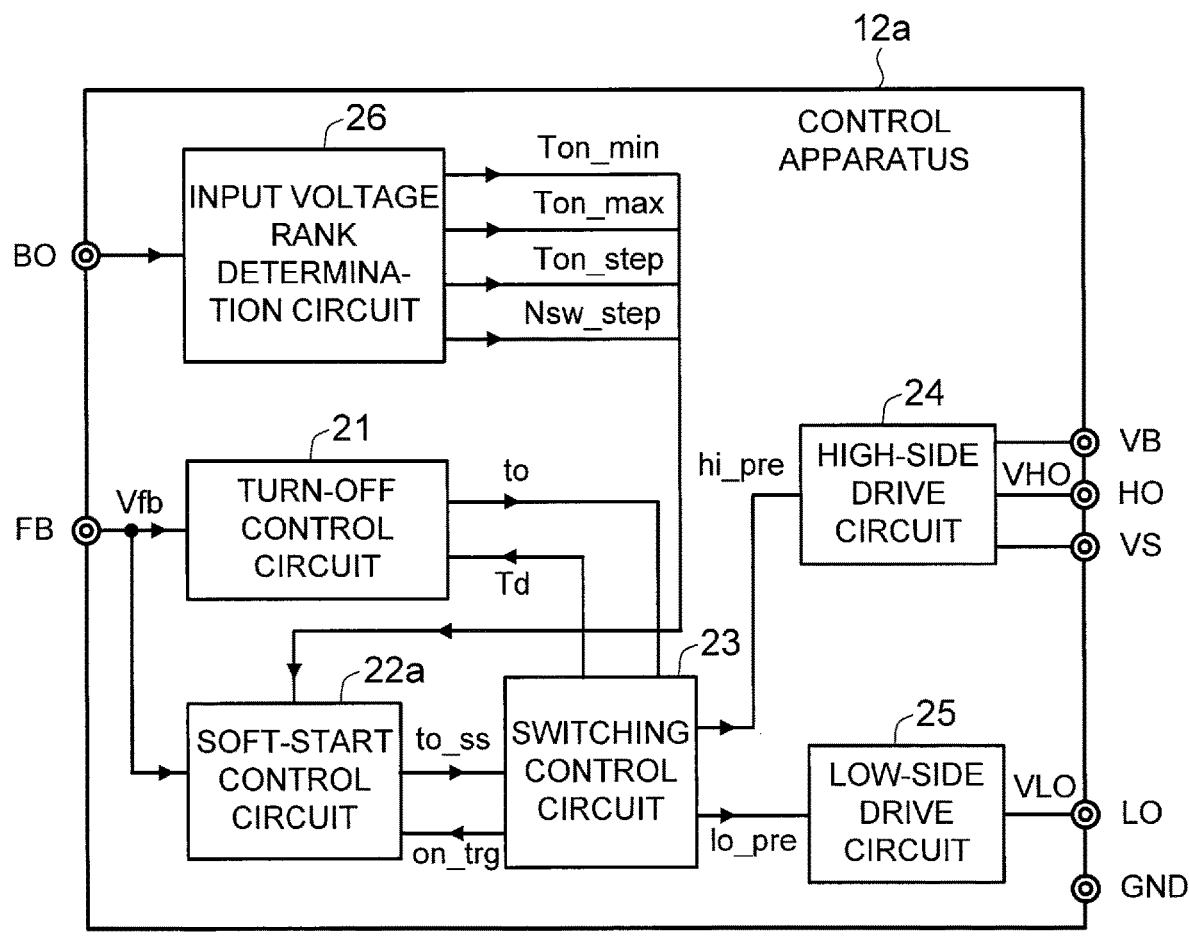
FIG. 10 is a block diagram illustrating a configuration example of the control apparatus according to the second embodiment.
Figure 12:
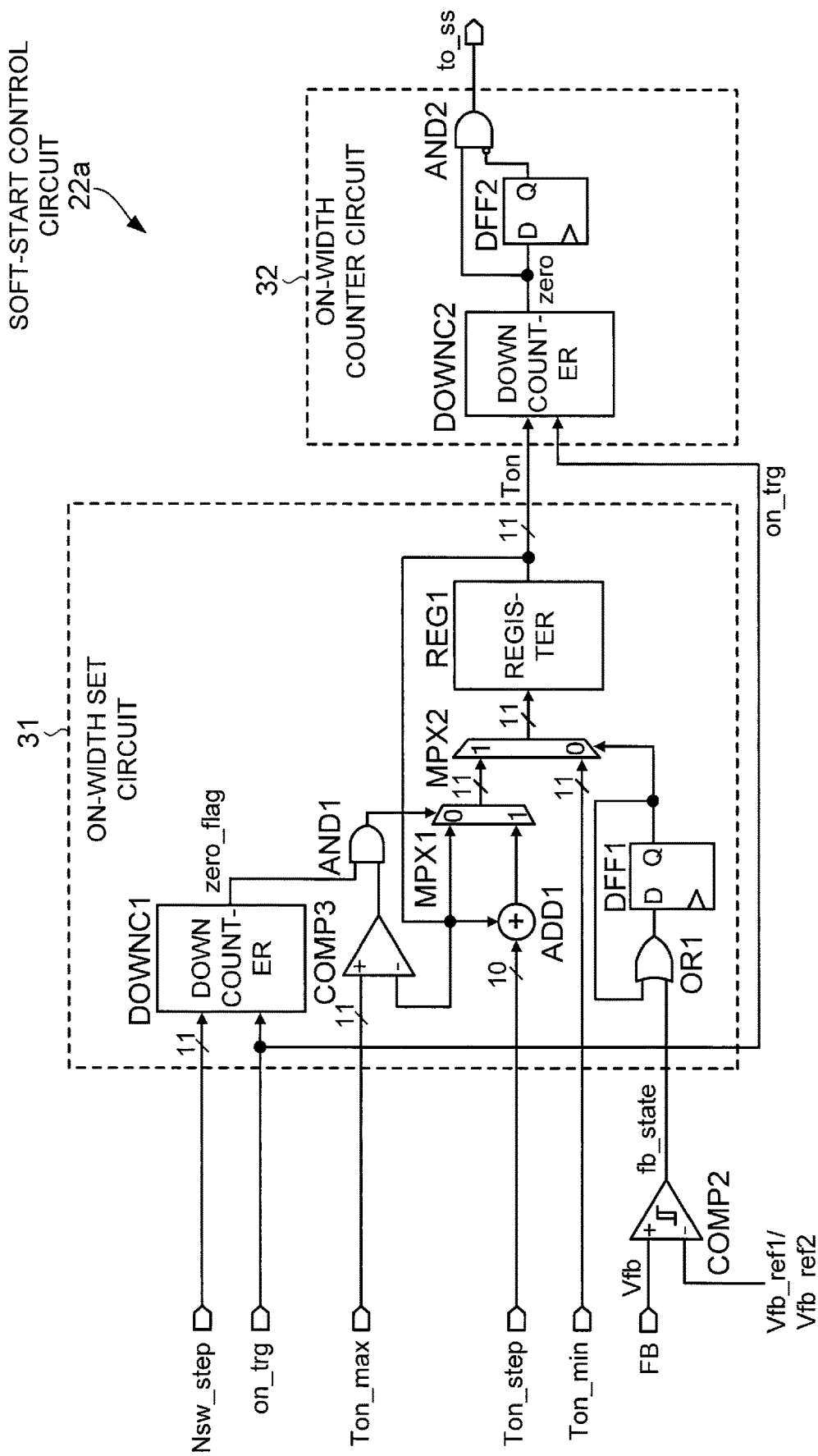
FIG. 12 is a circuit diagram illustrating a configuration example of a soft-start control circuit.
Figure 13:
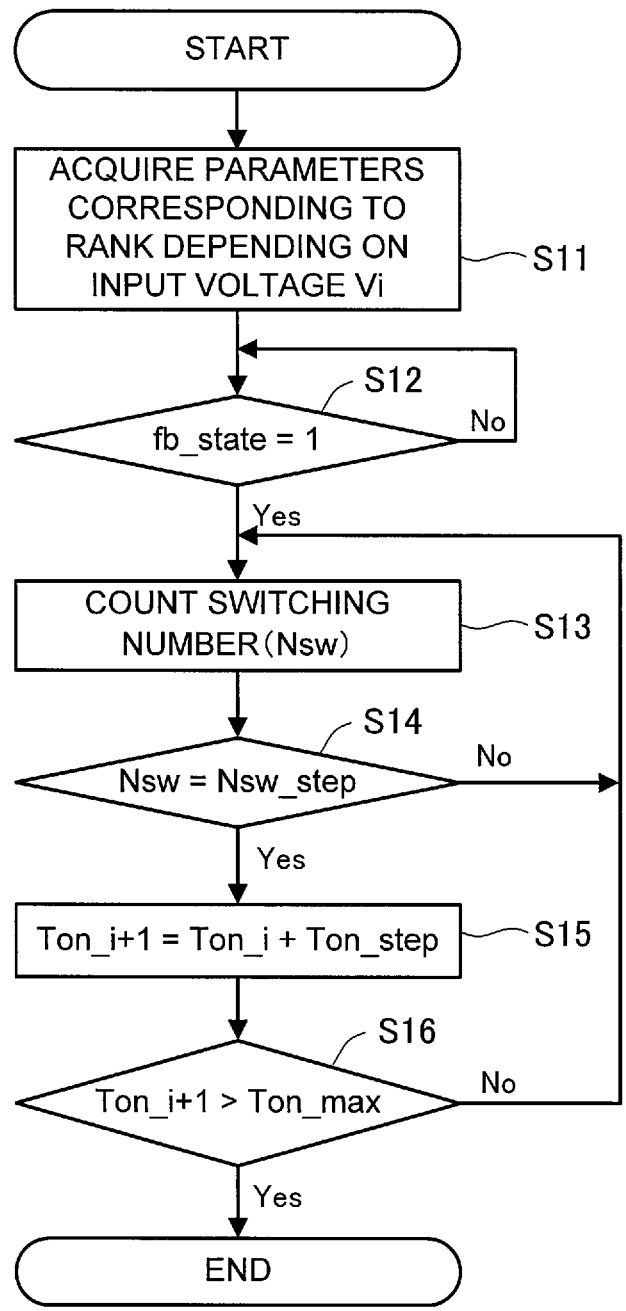
FIG. 13 is a flowchart illustrating an operation of the soft-start control circuit.

FIG. 9 is a circuit diagram illustrating a configuration example of a switching power supply to which a control apparatus according to a second embodiment is applied. FIG. 10 is a block diagram illustrating a configuration example of the control apparatus according to the second embodiment. FIG. 11 illustrates examples of rank-specific parameter values based on an input voltage. FIG. 12 is a circuit diagram illustrating a configuration example of a soft-start control circuit. FIG. 13 is a flowchart illustrating an operation of the soft-start control circuit. In FIGS. 9, 10, and 12, elements which are the same as or equivalent to those illustrated in FIGS. 1, 2, and 4 will be denoted by the same reference characters, and detailed descriptions thereof will be omitted.

The switching power supply illustrated in FIG. 9 includes a resistor R9 having one end connected to an input terminal 10p and the other terminal connected to one end of a resistor R10. The other terminal of the resistor R10 is connected to an input terminal 10n. A connection point of the resistors R9 and R10 is connected to a terminal BO of a control apparatus 12a. Other aspects of the configuration are the same as those of the switching power supply in FIG. 1.

The resistors R9 and R10 constitute a voltage-dividing circuit and receives a voltage obtained by dividing an input voltage Vi by the resistance ratio of the resistors R9 and R10. In this way, the control apparatus 12a is able to detect the value of the input voltage Vi inputted to the input terminals 10p and 10n and control the soft-start with an optimum value based on the value of the input voltage Vi.

As illustrated in FIG. 10, the control apparatus 12a includes an input voltage rank determination circuit 26 in addition to the elements in the control apparatus 12 (FIG. 2) according to the first embodiment. While the control apparatus 12 according to the first embodiment uses parameters which are fixed values determined in advance, this input voltage rank determination circuit 26 generates parameters that change depending on the input voltage Vi. Thus, the input voltage rank determination circuit 26 has an input terminal connected to the terminal BO and output terminals for a minimum on-width signal Ton_min, a maximum on-width signal Ton_max, a step signal Ton_step, and an incremental switching number signal Nsw_step. These output terminals of the input voltage rank determination circuit 26 are connected to parameter input terminals of a soft-start control circuit 22a.

In an example in FIG. 11, the input voltage rank determination circuit 26 determines one of ranks 0 to 15 to which the input voltage Vi that ranges from 380 V to 100 V belongs. The values of the minimum on-width signal Ton_min, the maximum on-width signal Ton_max, the step signal Ton_step, and the incremental switching number signal Nsw_step are set per rank. For this determination, the input voltage rank determination circuit 26 may be configured by using, for example, 16 comparators, logic circuits that determine the rank from the output signals of the comparators, and a memory that holds a signal value per rank. When the comparators and the logic circuits determine the input voltage Vi and the rank corresponding thereto, the parameters corresponding thereto are read from the memory and are supplied to the soft-start control circuit 22a.

As illustrated in FIG. 12, the soft-start control circuit 22a has input terminals for the parameters of the minimum on-width signal Ton_min, the maximum on-width signal Ton_max, the step signal Ton_step, and the incremental switching number signal Nsw_step, in addition to a terminal FB, a terminal on_trg, and a terminal to_ss. The minimum on-width signal Ton_min and the maximum on-width signal Ton_max are inputted to a multiplexer circuit MPX2 and a digital comparator COMP3 in an on-width set circuit 31, respectively. The step signal Ton_step and the switching number signal Nsw_step are inputted to an adder circuit ADD1 and a down counter DOWNC1 in the on-width set circuit 31, respectively.

The on-width set circuit 31 and an on-width counter circuit 32 in the soft-start control circuit 22a have the same configuration and performs the same operation as those of the soft-start control circuit 22 (FIG. 4).

The soft-start control circuit 22a in the control apparatus 12a according to the second embodiment performs an operation in accordance with a flowchart illustrated in FIG. 13. First, when the switching power supply is started and soft-start is started, the input voltage rank determination circuit 26 determines the input voltage Vi and the rank corresponding thereto and outputs the parameters corresponding to the rank. In this case, the soft-start control circuit 22a acquires the parameters corresponding to the rank depending on the input voltage Vi from the input voltage rank determination circuit 26, as illustrated in FIG. 13 (step S11). As a result, the value of the incremental switching number signal Nsw_step is set in the down counter DOWNC1. In addition, the maximum on-width signal Ton_max is applied to the digital comparator COMP3, and the step signal Ton_step is inputted to the adder circuit ADD1. In addition, the minimum on-width signal Ton_min is inputted to the multiplexer circuit MPX2. In this case, since the feedback state signal fb_state is at an L level "0", the multiplexer circuit MPX2 selects and stores the minimum on-width signal Ton_min in a register REG1.

When the feedback state signal fb_state subsequently rises to an H level "1" (step S12), the multiplexer circuit MPX2 selects the output of a multiplexer circuit MPX1, and the down counter DOWNC1 begins to count the switching number Nsw (step S13). Initially, the register REG1 outputs the minimum on-width signal Ton_min as an on-width signal Ton. Step S11 may alternatively be performed after the feedback state signal fb_state rises to an H level "1" (after step S12).

Next, the on-width set circuit 31 determines whether the down counter DOWNC1 has counted the switching number Nsw to the value set by the incremental switching number signal Nsw_step (step S14). If the down counter DOWNC1 has not counted the switching number Nsw to the value set by the incremental switching number signal Nsw_step, the processing returns to step S13, and the down counter DOWNC1 continues to count the switching number Nsw.

If the down counter DOWNC1 has counted the switching number Nsw to the value set by the incremental switching number signal Nsw_step, the on-width set circuit 31 assigns Ton_i+Ton_step (i is a positive integer) to Ton_i+1 (step S15).

Next, the on-width set circuit 31 determines whether the incremented Ton_i+1 has exceeded the value of the maximum on-width signal Ton_max (step S16). If Ton_i+1 has not exceeded the value of the maximum on-width signal Ton_max, the processing returns to step S13, and the down counter DOWNC1 continues to count the switching number Nsw.

In step S16, if Ton_i+1 has exceeded the value of the maximum on-width signal Ton_max, the on-width set circuit 31 fixes the on-width signal Ton to the value of the maximum on-width signal Ton_max and ends this increment operation.

The control apparatus 12a according to the second embodiment is suitably applied to a control apparatus of a worldwide fast-response current resonance type switching power supply having a different input voltage Vi, and an overshoot that occurs when the switching power supply is started is reduced.

While the control apparatus 12a according to the second embodiment uses the switching number Nsw as a predetermined index, this is only an example.

Each of the control apparatuses of the switching power supplies having the above configurations includes a soft-start circuit that suitably performs soft-start.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A control apparatus of a current resonance type switching power supply that has a switching element and generates an output voltage, the control apparatus comprising:
    a drive circuit configured to generate a drive signal to drive the switching element of the switching power supply; and
    a soft-start control circuit connected to the drive circuit, the soft-start control circuit being configured to send a signal to the drive circuit to cause the drive circuit to increment an on-width of the drive signal by a prescribed step per prescribed switching number, thereby to gradually increase a switching period of the switching element from a beginning of a soft start period to an end of the soft start period, to gradually decrease a switching frequency of the switching element from the beginning of the soft start period to the end of the soft start period, and to reduce an overshoot of the output voltage when the switching power supply is started, wherein the soft-start control circuit
implements a first step of holding the on-width of the drive signal for a predetermined time corresponding to the prescribed switching number,
implements a second step of increasing the on-width of the drive signal by the prescribed step after the predetermined time, and
repeats the first step and the second step, alternately.

2. The control apparatus of the switching power supply according to claim 1, wherein the soft-start control circuit maintains a duty cycle of the drive signal.

3. The control apparatus of the switching power supply according to claim 1, wherein the soft-start control circuit receives a feedback voltage, and includes
a comparator that detects rising of the feedback voltage,
an on-width set circuit that generates an on-width signal by incrementing the on-width by the prescribed step per prescribed switching number, and
an on-width counter circuit that generates a soft-start turn-off signal indicating a timing at which the generated on-width signal ends.

4. The control apparatus of the switching power supply according to claim 3, wherein the on-width set circuit includes:
a first counter that counts a number of on-triggers of the drive signal, and outputs a zero flag signal each time the number of on-triggers reaches the prescribed switching number;
a register that holds a value of the on-width;
an adder that adds the prescribed step to the value held in the register;
a first multiplexer that selects the value held in the register when the zero flag signal is not outputted and selects an output of the adder when the zero flag signal is outputted; and
a second multiplexer that selects an initial value of the on-width before the comparator detects the rising of the feedback voltage, selects an output of the first multiplexer after the comparator detects the rising of the feedback voltage, and outputs the selected initial value or the selected output of the first multiplexer to the register.

5. The control apparatus of the switching power supply according to claim 4, wherein the on-width set circuit includes:
a digital comparator that compares the value held in the register with a maximum on-width signal; and
an AND circuit that disables the zero flag signal only when the value held in the register exceeds the maximum on-width signal.

6. The control apparatus of the switching power supply according to claim 5, wherein the on-width set circuit includes a self-holding circuit that maintains, when the comparator detects the rising of the feedback voltage, a level of an output of the self-holding circuit.

7. The control apparatus of the switching power supply according to claim 5, further comprising an input voltage rank determination circuit that determines a rank of input voltages of the switching power supply inputted when the switching power supply is started and outputs a value corresponding to the rank to the on-width set circuit.

8. The control apparatus of the switching power supply according to claim 7, wherein the value corresponding to the rank includes at least one of the switching number counted by the first counter, the step added by the adder, a minimum on-width signal that is an initial value of the on-width selected by the second multiplexer, or a maximum on-width signal that is a reference input signal of the digital comparator.

9. The control apparatus of the switching power supply according to claim 3, wherein the on-width counter circuit includes:
a second counter that counts a number of on-triggers of the drive signal, and outputs a zero signal when the number of on-triggers reaches a value of the on-width signal; and
a one-shot circuit that outputs the soft-start turn-off signal having a prescribed on-width based on the zero signal.

10. A control apparatus of a current resonance type switching power supply that has a switching element and generates an output voltage, the control apparatus comprising:
a drive circuit configured to generate a drive signal to drive the switching element of the switching power supply;
a soft-start control circuit connected to the drive circuit, the soft-start control circuit being configured to send a signal to the drive circuit to cause the drive circuit to increment an on-width of the drive signal by a prescribed step per prescribed switching number, thereby to gradually increase a switching period of the switching element from a beginning of a soft start period to an end of the soft start period, to gradually decrease a switching frequency of the switching element from the beginning of the soft start period to the end of the soft start period, and to reduce an overshoot of the output voltage when the switching power supply is started; and
an input voltage rank determination circuit that determines a rank based on input voltages of the switching power supply inputted when the switching power supply is started, and outputs a value corresponding to the rank, wherein
the soft-start control circuit
implements a first step of holding the on-width of the drive signal for a predetermined time corresponding to the prescribed switching number,
implements a second step of increasing the on-width of the drive signal by the prescribed step after the predetermined time, and
repeats the first step and the second step, alternately.

11. The control apparatus of the switching power supply according to claim 10, wherein
the input voltage rank determination circuit outputs, as the value corresponding to the rank, at least one of the prescribed step for incrementing the on-width of the drive signal per prescribed switching number, an initial value of the on-width, a maximum value of the on-width, or the prescribed switching number, to the soft-start control circuit.

12. The control apparatus of the current resonance type switching power supply according to claim 1, wherein
the control apparatus receives a feedback voltage based on the output voltage,
when the feedback voltage is larger than a first threshold voltage, the soft-start control circuit implements the first step and the second step, and repeats the first step and the second step, alternately, and the drive circuit drives the switching element using the on-width of the drive signal and the switching frequency of the switching element according to the first step, the second step, and the alternately repeated first and second steps, and when the feedback voltage is smaller than the first threshold voltage, the drive circuit stops driving the switching element according to the first step, the second step, and the alternately repeated first and second steps, and the drive circuit drives the switching element according to the on-width of the drive signal and the switching frequency of the switching element based on the feedback voltage.

13. The control apparatus of the current resonance type switching power supply according to claim 10, wherein the control apparatus receives a feedback voltage based on the output voltage, when the feedback voltage is larger than a first threshold voltage, the soft-start control circuit implements the first step and the second step, and repeats the first step and the second step, alternately, and the drive circuit drives the switching element using the on-width of the drive signal and the switching frequency of the switching element according to the first step, the second step, and the alternately repeated first and second steps, and when the feedback voltage is smaller than the first threshold voltage, the drive circuit stops driving the switching element according to the first step, the second step, and the alternately repeated first and second steps, and the drive circuit drives the switching element according to the on-width of the drive signal and the switching frequency of the switching element based on the feedback voltage.

* * * * *